United States Patent
Abd Elhamid et al.

(10) Patent No.: US 8,497,049 B2
(45) Date of Patent: Jul. 30, 2013

(54) HYDROPHILIC AND CORROSION RESISTANT FUEL CELL COMPONENTS

(75) Inventors: Mahmoud H. Abd Elhamid, Grosse Pointe Woods, MI (US); Youssef M. Mikhail, Sterling Heights, MI (US); Gayatri Vyas Dadheech, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1113 days.

(21) Appl. No.: 11/695,258

(22) Filed: Apr. 2, 2007

(65) Prior Publication Data

US 2009/0325025 A1 Dec. 31, 2009

(51) Int. Cl.
*H01M 4/64* (2006.01)

(52) U.S. Cl.
USPC .......................................... 429/517; 429/518

(58) Field of Classification Search
USPC ........................................................ 429/457
See application file for complete search history.

(56) References Cited

U.S. PATENT DOCUMENTS

| 5,624,769 | A | 4/1997 | Li et al. |
| 6,258,476 | B1 | 7/2001 | Cipollini |
| 6,656,624 | B1 * | 12/2003 | King .............................. 429/454 |
| 6,733,911 | B2 | 5/2004 | Kawahara |
| 7,179,547 | B2 * | 2/2007 | Yan et al. ...................... 428/701 |
| 2003/0138686 | A1 * | 7/2003 | Kotani et al. .................... 429/32 |
| 2006/0177726 | A1 * | 8/2006 | Kim et al. ........................ 429/41 |
| 2007/0298294 | A1 * | 12/2007 | Kubota et al. ................... 429/22 |
| 2009/0214926 | A1 * | 8/2009 | Watanabe et al. ............... 429/34 |

FOREIGN PATENT DOCUMENTS

WO  WO 2006-135108  * 12/2006

* cited by examiner

*Primary Examiner* — Ula C Ruddock
*Assistant Examiner* — Jacob Marks
(74) *Attorney, Agent, or Firm* — BrooksGroup

(57) ABSTRACT

One embodiment disclosed includes a product comprising a fuel cell bipolar plate comprising a substrate comprising a first face, a reactant gas flow field defined in the first face, and a layer over at least a portion of the first face, wherein the layer comprises a zeolite.

26 Claims, 3 Drawing Sheets

HYDROPHILIC AND CORROSION RESISTANT FUEL CELL COMPONENTS

TECHNICAL FIELD

The disclosure generally relates to fuel cell components, such as bipolar plates, having hydrophilic and corrosion resistant properties.

BACKGROUND

Hydrogen is a very attractive fuel because it is clean and can be used to efficiently produce electricity in a fuel cell. The automotive industry expends significant resources in the development of hydrogen fuel cells as a source of power for vehicles. Fuel cell vehicles are more efficient and generate fewer emissions than today's vehicles employing internal combustion engines.

A hydrogen fuel cell is an electro-chemical device that includes an anode and a cathode with an electrolyte therebetween. The anode receives hydrogen-rich gas or pure hydrogen and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work may be used to operate a vehicle, for example.

Proton exchange membrane (PEM) fuel cells are popular for vehicle applications. The PEM fuel cell generally includes a solid-polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture, and the membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. For the automotive fuel cell stack mentioned above, the stack may include about two hundred or more bipolar plates. The fuel cell stack receives a cathode reactant gas, typically a flow of air forced through the stack by a compressor. Not all of the oxygen is consumed by the stack and some of the air is output as a cathode exhaust gas that may include liquid water as a stack by-product. The fuel cell stack also receives an anode hydrogen reactant gas that flows into the anode side of the stack.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates may also include flow channels for a cooling fluid.

The bipolar plates are typically made of a conductive material, such as stainless steel, titanium, aluminum, polymeric carbon composites, etc., so that they conduct the electricity generated by the fuel cells from one cell to the next cell and out of the stack. Metal bipolar plates typically have a natural oxide on their outer surface that makes them resistant to corrosion. However, this oxide layer is not conductive, and thus increases the internal resistance of the fuel cell, reducing its electrical performance.

As is well understood in the art, typically the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below 0.2 A/cm$^2$, water accumulates within the flow channels because the flow rate of the reactant gas is too low to force the water out of the channels. As the water accumulates, it forms droplets that continue to expand because of the hydrophobic nature of the plate material. The contact angle of the water droplets is generally about 90° in that the droplets form in the flow channels substantially perpendicular to the flow of the reactant gas. As the size of the droplets increases, the flow channel is closed off, and the reactant gas is diverted to other flow channels because the channels flow in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

In a PEM fuel cell environment, the bipolar plates are in constant contact with highly acidic solutions (pH 3-5) containing $F^-$, $SO_4^-$, $SO_3^-$, $HSO_4^-$, $CO_3^-$, and $HCO_3^-$, etc. Moreover, the cathode operates in a highly oxidizing environment, being polarized to a maximum of about +1 V (versus the normal hydrogen electrode) while being exposed to pressurized air. Finally, the anode is constantly exposed to atmospheric hydrogen. Hence, contact elements made from metal must be resistant to acids, oxidation, and hydrogen embrittlement in the fuel cell environment. As few metals exist that meet this criteria, contact elements have often been fabricated from large pieces of graphite which is corrosion-resistant, and electrically conductive in the PEM fuel cell environment. However, graphite is quite fragile, and quite porous making it extremely difficult to make very thin gas impervious plates therefrom.

Lightweight metals, such as aluminum and its alloys, have also been proposed for use in making fuel cell contact elements. Such metals are more conductive than graphite and can be formed into very thin plates. However, such light weight metals are susceptible to corrosion in the hostile PEM fuel cell environment. In light of the corrosion sensitivity of lightweight metals, efforts have been made to develop protective coatings. Yet some of these protection methods increase the electrical resistance of the aluminum plate to unacceptable levels. Other methods of protection keep the conductivity at an acceptable level, but do not sufficiently achieve the desired level of protection.

SUMMARY OF EXEMPLARY EMBODIMENTS OF THE INVENTION

One embodiment disclosed includes a product comprising a fuel cell bipolar plate comprising a substrate comprising a first face, a reactant gas flow field defined in the first face, and a layer over at least a portion of the first face, wherein the layer comprises a zeolite.

Other exemplary embodiments of the invention will become apparent from the detailed description provided hereinafter. It should be understood that the detailed description and specific examples, while indicating the exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings.

DETAILED DESCRIPTION OF EXEMPLARY EMBODIMENTS

The following description of the embodiments is merely exemplary in nature and is in no way intended to limit the invention, its application, or uses. In one embodiment, zeolite coatings may benefit a PEM fuel cell operation by improving the corrosion resistance and water transport in bipolar plate channels.

Figure 1:
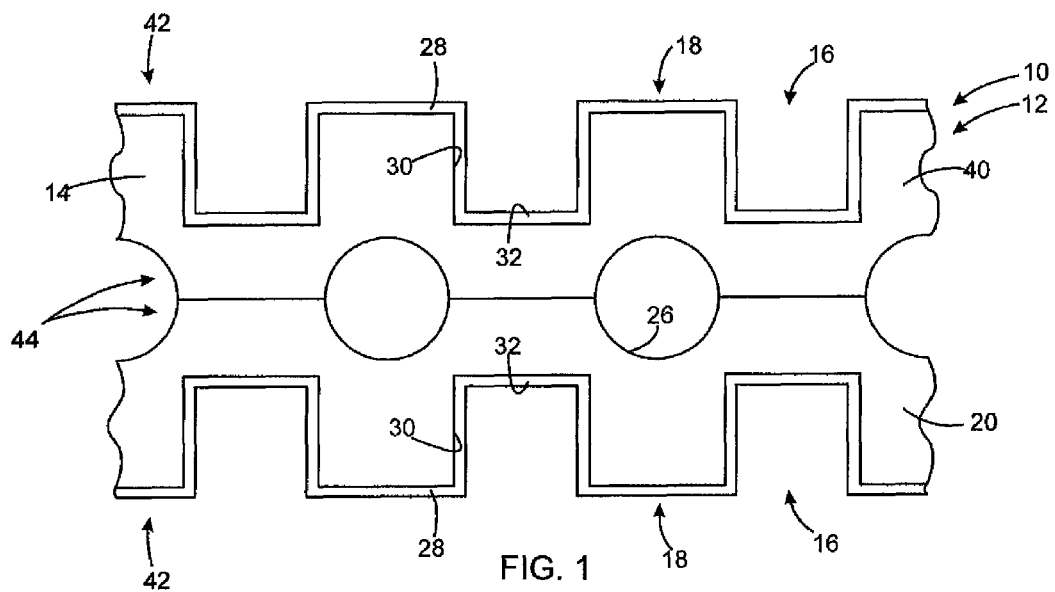
FIG. 1 illustrates a broken-away, cross-sectional view of a bipolar plate for a fuel cell including a hydrophilic and corrosion resistant layer, according to one embodiment of the invention.

According to one embodiment of the invention, illustrated in FIG. 1, a product 10 comprises a substrate 14. In one embodiment, the substrate 14 may be a bipolar plate 12 having a first face 42 and a second face 44. The bipolar plate 12 may include two sheets 40 and 20. The two sheets 40 and 20 may be machined or stamped and are typically welded together. A reactant gas flow field comprising flow channels 16 and lands 18 is defined in the first face 42. The channels 16 comprise sidewall(s) 30 and bottom wall 32. Cooling fluid flow channels 26 may be provided over the second face 44. In one embodiment, the substrate 14 comprises a conductive material, for example stainless steel, titanium, aluminum, or polymeric composites including electrically conductive materials such as carbon fibers or the like. A layer 28 is provided over at least a portion of the first face 42. The layer 28 may be hydrophilic and corrosion resistant. In one embodiment, the layer 28 comprises a zeolite. The zeolite may include an aluminosilicate tetrahedral framework, ion-exchangeable large cations, and a stable three-dimensional structure.

Zeolite coatings are hydrophilic stable coatings and good ion exchange resins. In one embodiment, a zeolite layer is constructed and arranged in a manner sufficient to provide a hydrophilic stable coating in a fuel cell to improve water management. Zeolite coatings may be stable at a low pH. Zeolites may function to minimize the contamination of the MEA by metal cations, for example fluoride ions. In one embodiment, a zeolite layer is constructed and arranged in a manner sufficient to trap or capture metal cations that leach out of the bipolar plates or other components of the fuel cell stack. Metal cations may be produced in the fuel cell environment because of degradation of the MEA. Metal cations may reduce performance of the fuel cell stack by increasing the resistance of the MEA, impairing the stability of the membrane through chemical degradation, and/or impacting the ion exchange capacity of the membrane.

In one embodiment, the layer 28 comprises a zeolite comprising aluminum oxide, silicon oxide, or a mixture thereof. The layer 28 may also comprise at least one zeolite powder impregnated inside at least one binder such as a polymer resin. A suitable polymer resin may include a water insoluble polymer that can be formed into a thin adherent film and that can withstand the hostile oxidative and acidic environment of the fuel cell. Examples of a suitable polymer resin include an epoxide, polyamide-imide, polyether-imide, polyphenole, fluoroelastomer (e.g., polyvinyldene fluoride), polyester, phenoxy-phenolic, epoxide-phenolic, acrylic, and urethane. In one embodiment, the polymer resin may be a cross-linked polymer, for example a polyamide-imide thermosetting polymer, and may be employed for producing impermeable coatings.

In one embodiment, the layer 28 may comprise a zeolite mixed with at least one of carbon fibers, carbon nanotubes, carbon black, graphite, gold, silver, carbides, or nitrides. The carbon black or graphite may have a particle size ranging from about 0.05 micron to about 3 microns. In one embodiment, the layer 28 may be formed over the channels and may include about 100 weight percent zeolite. In one embodiment, the layer 28 may be sprayed and may include about 5 to about 50 weight percent zeolite. In one embodiment, the layer 28 may comprise about 30 to about 70 weight percent binder. Suitable binders include those described above. In one embodiment, the layer 28 may comprise about 5 to about 70 weight percent carbon.

In one embodiment, the zeolite may be the zeolite "ZSM-5," an aluminosilicate zeolite with a high silica and low aluminum content. For example, the $SiO_2/Al_2O_3$ mole ratio may be in the range of 15-100, 25-30, or 50-55. The structure of the ZSM-5 zeolite is based on channels with intersecting tunnels. The aluminum sites are very acidic. The substitution of $Al^{3+}$ in place of the tetrahedral $Si^{4+}$ silica requires the presence of an added positive charge. When this is $H^+$, the acidity of the zeolite is very high. The ZSM-5 may have a surface area of 400-425 $m^2/g$. In one embodiment, the zeolite may be made by a hydrothermal process. In one embodiment, the zeolite may be chemically stable, porous, and hydrophilic. The zeolite may have a pore size ranging from about 0.4 nanometers to about 10 nanometers and a contact angle ranging from about 0 to about 20 degrees.

In one embodiment, the layer 28 may have a minimum thickness of about 40 nanometers. In another embodiment, the thickness of the layer 28 may range from about 100 nanometers to about 500 nanometers. In yet another embodiment the thickness of layer 28 may range from about 0.5 micron to about 2 microns.

The layer 28 may be formed over the bipolar plate 12 by any suitable technique including, but not limited to, physical vapor deposition processes, chemical vapor deposition (CVD) processes, thermal spraying processes, sol-gel, spraying, dipping, brushing, spinning on, or screen printing. Suitable examples of physical vapor deposition processes include electron beam evaporation, magnetron sputtering, and pulsed plasma processes. Suitable chemical vapor deposition processes include plasma enhanced CVD and atomic layer deposition processes. CVD deposition processes may be more suitable for the thin film layers of the layer 28.

Figure 2:
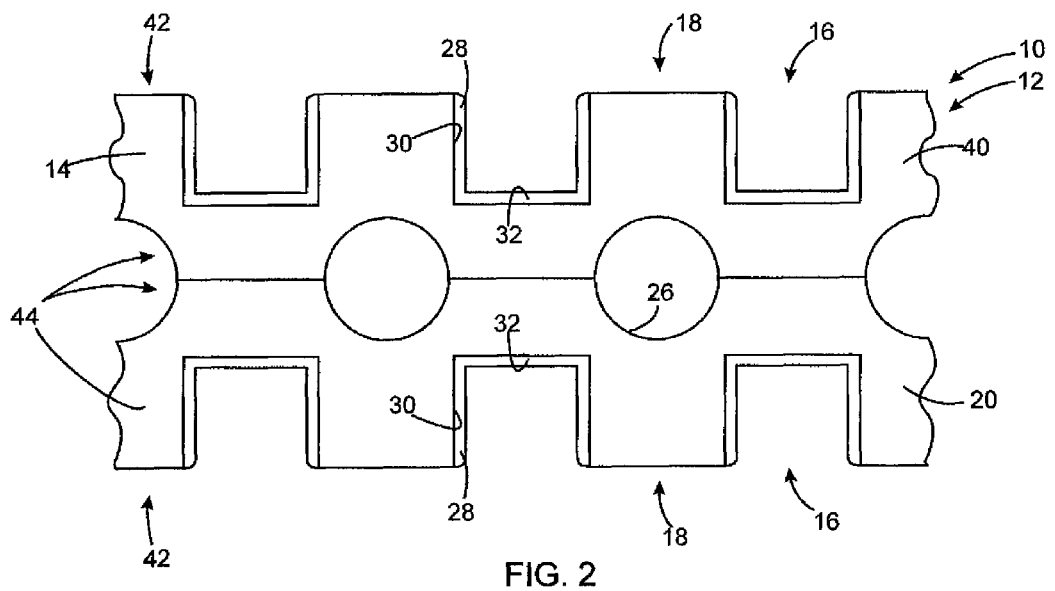
FIG. 2 illustrates a broken-away, cross-sectional view of a bipolar plate for a fuel cell including a hydrophilic and corrosion resistant layer over the channels of the bipolar plate, according to another embodiment of the invention.

Referring now to FIG. 2, the layer 28 may be selectively provided only over sidewalls 30 and bottom wall 32 of channels 16. This may be done, for example, by selectively depositing a mask over the lands 28 of bipolar plate 12. Thereafter the layer 18 may be formed over at least the exposed portions of the first face 42 of bipolar plate 12 to limit the area of formation of the layer to a non-masked portion. The mask may subsequently be removed.

Figure 3:
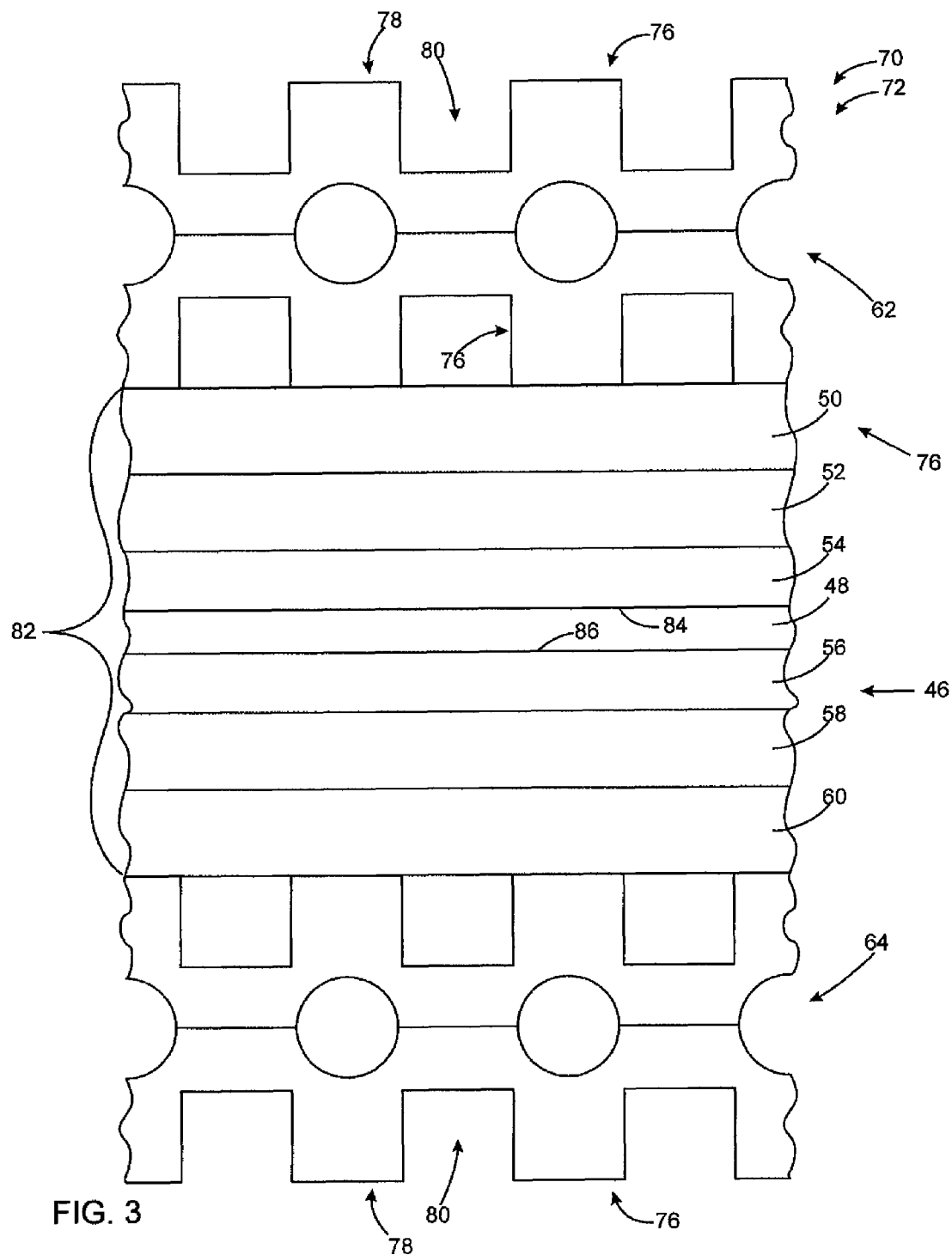
FIG. 3 illustrates a broken-away, cross-sectional view of a fuel cell that includes bipolar plates having a hydrophilic and corrosion resistant layer, according to one embodiment of the invention.

In another embodiment of the invention illustrated in FIG. 3, a product 70 comprises a fuel cell 72. The product 70 comprises a first bipolar plate 62 having a first face 76 having a reactant gas flow field defined therein by a plurality of lands 78 and channels 80, a second bipolar plate 64 having a first face 76 having a reactant gas flow field defined therein by a plurality of lands 78 and channels 80, and a soft goods portion 82 provided therebetween. The soft goods portion 82 may include a polymer electrolyte membrane 48 comprising a first face 84 and a second face 86. A cathode 54 may overlie the first face 84 of the polymer electrolyte membrane 48. A first gas diffusion media layer 50 may overlie the cathode 54, and optionally a first microporous layer 52 may be interposed between the first gas diffusion media layer 50 and the cathode 54. The first bipolar plate 62 overlies the first gas diffusion media layer 50. An anode 56 may underlie the second face 86 of the polymer electrolyte membrane 48. A second gas diffusion media layer 60 may underlie the anode layer 56, and optionally a second microporous layer 58 may be interposed between the second gas diffusion media layer 60 and the anode 56. The second bipolar plate 64 may overlie the second gas diffusion media layer 60.

Figure 4A:
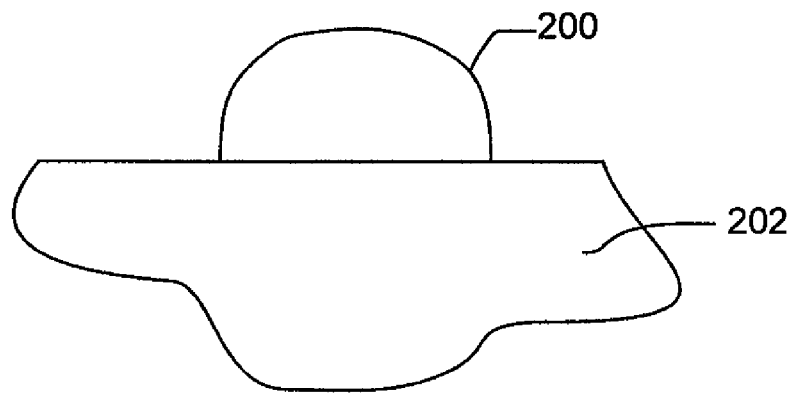
FIG. 4A illustrates a drop of water placed on a stainless steel substrate without a coating.
Figure 4B:
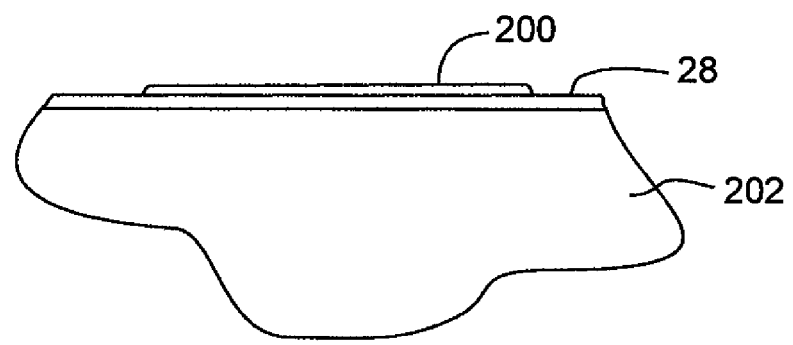
FIG. 4B illustrates a drop of water placed on a stainless steel substrate having a layer comprising a zeolite, according to one embodiment of the invention.

FIG. 4A illustrates a drop of water 200 placed on stainless steel 202 without a coating. FIG. 4B illustrates a drop of water 200 placed on stainless steel 202 having a zeolite layer 28 according to one embodiment of the invention. The zeolite layer 28 significantly reduces the water contact angle. The water contact angle of the zeolite layer 28 may range from about 0 to about 20 degrees.

When the terms "over", "overlying", "overlies" or the like are used herein with respect to the relative position of layers to each other, such shall mean that the layers are in direct contact with each other or that another layer or layers may be interposed between the layers.

The description of the invention is merely exemplary in nature and, thus, variations thereof are not to be regarded as a departure from the spirit and scope of the invention.

What is claimed is:

1. A product comprising:
a bipolar plate having a first face that defines a reactant gas flow field comprising lands and channels, the bipolar plate being constructed from a metal; and
a coating layer over at least a portion of the first face, wherein the coating layer has a thickness of about 40 nanometers to about 2 microns and comprises at least one zeolite.

2. A product as set forth in claim 1 wherein the zeolite has a pore size of about 0.4 nanometer to about 10 nanometers.

3. A product as set forth in claim 1 wherein the zeolite has a contact angle of about 0 to about 20 degrees.

4. A product as set forth in claim 1 wherein the metal is selected from the group consisting of stainless steel, titanium, and aluminum.

5. A product as set forth in claim 1 wherein the coating layer further comprises aluminum oxide.

6. A product as set forth in claim 1 wherein the coating layer further comprises silicon oxide.

7. A product as set forth in claim 1 wherein the coating layer further comprises aluminum oxide and silicon oxide.

8. A product as set forth in claim 1 wherein the coating layer further comprises at least one zeolite powder impregnated inside at least one binder.

9. A product as set forth in claim 8 wherein the binder comprises at least one of a polyamide-imide, epoxy, polyether-imide, polyphenole, fluoroelastomer, polyvinyldene fluoride, polyester, phenoxy-phenolic, epoxide-phenolic, acrylic, urethane, cross-linked polymer, or polyamide-imide thermosetting polymer.

10. A product as set forth in claim 1 wherein the coating layer further comprises carbon fibers.

11. A product as set forth in claim 1 wherein the coating layer further comprises carbon nanotubes.

12. A product as set forth in claim 1 wherein the coating layer further comprises carbon black.

13. A product as set forth in claim 12 wherein the carbon black has a particle size ranging from about 0.05 micron to about 3 microns.

14. A product as set forth in claim 1 wherein the coating layer further comprises graphite.

15. A product as set forth in claim 14 wherein the graphite has a particle size ranging from about 0.05 micron to about 3 microns.

16. A product as set forth in claim 1 wherein the coating layer further comprises gold.

17. A product as set forth in claim 1 wherein the coating layer further comprises silver.

18. A product as set forth in claim 1 wherein the coating layer further comprises carbides.

19. A product as set forth in claim 1 wherein the coating layer further comprises nitrides.

20. A product as set forth in claim 1 wherein the coating layer further comprises at least one of carbon fibers, carbon nanotubes, carbon black, graphite, gold, silver, carbides, or nitrides.

21. A product as set forth in claim 1 wherein the coating layer further comprises about 5 to about 70 weight percent carbon.

22. A product as set forth in claim 1 wherein the coating layer further comprises about 30 to about 70 weight percent binder.

23. A product as set forth in claim 22 wherein the binder comprises at least one of a polyamide-imide, epoxy, polyether-imide, polyphenole, fluoroelastomer, polyvinyldene fluoride, polyester, phenoxy-phenolic, epoxide-phenolic, acrylic, urethane, cross-linked polymer, or polyamide-imide thermosetting polymer.

24. A product as set forth in claim 1 wherein the coating layer comprises about 5 to about 50 weight percent zeolite.

25. A product as set forth in claim 1 wherein the zeolite is a high silica aluminosilicate zeolite.

26. A product comprising:
a metal bipolar plate comprising a first face that defines a reactant gas flow field and a layer over at least a portion of the first face, wherein the layer is about 40 nanometers to about 2 microns thick and comprises an aluminosilicate zeolite impregnated in a polymer resin, the aluminosilicate zeolite having a $SiO_2/Al_2O_3$ mole ratio in a range from about 15 to about 100.

* * * * *